United States Patent
Combes et al.

(10) Patent No.: US 10,882,630 B2
(45) Date of Patent: Jan. 5, 2021

(54) DUAL-FLOW JET ENGINE FOR AN AIRCRAFT WITH AN IMPROVED APERTURE

(71) Applicant: Airbus Operations SAS, Toulouse (FR)

(72) Inventors: Stéphane Combes, Buzet sur Tarn (FR); Jean Geliot, Toulouse (FR); Thomas Deforet, Toulouse (FR); Adeline Soulie, Verdun sur Garonne (FR); Benoit Orteu, Toulouse (FR)

(73) Assignee: AIRBUS OPERATIONS SAS, Toulouse (FR)

( * ) Notice: Subject to any disclaimer, the term of this patent is extended or adjusted under 35 U.S.C. 154(b) by 512 days.

(21) Appl. No.: 16/138,242

(22) Filed: Sep. 21, 2018

(65) Prior Publication Data

US 2019/0106221 A1     Apr. 11, 2019

(30) Foreign Application Priority Data

Sep. 29, 2017   (FR) ..................... 17 59093

(51) Int. Cl.
*B64D 29/08*   (2006.01)
*B64C 7/02*   (2006.01)
*F01D 25/24*   (2006.01)

(52) U.S. Cl.
CPC ............... *B64D 29/08* (2013.01); *B64C 7/02* (2013.01); *F01D 25/24* (2013.01); *F05D 2260/50* (2013.01)

(58) Field of Classification Search
CPC .......... B64C 7/02; B64D 29/00; B64D 29/02; B64D 29/04; B64D 29/06; B64D 29/08
See application file for complete search history.

(56) References Cited

U.S. PATENT DOCUMENTS

| | | | | |
|---|---|---|---|---|
| 2,494,347 A | * | 1/1950 | Matthews | ................. E05D 1/00 16/260 |
| 6,039,287 A | * | 3/2000 | Liston | .................... B64D 29/00 244/120 |

(Continued)

FOREIGN PATENT DOCUMENTS

| | | |
|---|---|---|
| EP | 2862805 A1 | 4/2015 |
| WO | 2015010271 A1 | 1/2015 |

OTHER PUBLICATIONS

French Search Report; priority document.

*Primary Examiner* — Philip J Bonzell
*Assistant Examiner* — Tye William Abell
(74) *Attorney, Agent, or Firm* — Greer, Burns & Crain, Ltd.

(57) ABSTRACT

A dual-flow jet engine comprising a fixed structure, a central core, and a cowl comprising a fixed part and a mobile cowl mounted to be rotationally mobile on the fixed structure via hinges with swan neck fitting. The fixed part has a first edge and the mobile cowl has a second edge, in which, when the mobile cowl is in a closed position, the second edge extends against the first edge. For each hinge with swan neck fitting, the fixed part is hollowed at the first edge, so as to delimit a recess opposite the swan neck fitting and allow the passage of the swan neck fitting when the mobile cowl switches from the closed position to the open position. The recess for each hinge with swan neck fitting allows for a reduction of the dimensions of the swan neck during the movement of the mobile cowl.

10 Claims, 4 Drawing Sheets

(56) References Cited

U.S. PATENT DOCUMENTS

| | | | |
|---|---|---|---|
| 9,873,504 B2* | 1/2018 | Aten | B64C 7/02 |
| 10,173,783 B2* | 1/2019 | Le Cadet | B64D 29/06 |
| 2016/0145918 A1* | 5/2016 | Liang | B64C 1/1446 |
| | | | 292/99 |
| 2019/0061967 A1* | 2/2019 | Lacko | B64D 29/06 |

* cited by examiner

DUAL-FLOW JET ENGINE FOR AN AIRCRAFT WITH AN IMPROVED APERTURE

CROSS-REFERENCES TO RELATED APPLICATIONS

This application claims the benefit of the French patent application No. 1759093 filed on Sep. 29, 2017, the entire disclosures of which are incorporated herein by way of reference.

TECHNICAL FIELD

The present invention relates to a dual-flow jet engine for an aircraft, the jet engine comprising a cowl mounted to be rotationally mobile relative to a fixed structure and an improved aperture. The present invention relates also to an aircraft comprising at least one such dual-flow jet engine.

BACKGROUND OF THE INVENTION

An aircraft conventionally comprises at least one wing under which a pylon is fixed with a dual-flow jet engine fixed to it.

FIG. 7 shows a dual-flow jet engine 600 of the prior art which comprises a central core 602 constituting the engine with a combustion chamber, a fan 604 which is at the front of the central core 602 and an inner cowl 606 which constitutes the inner wall of a secondary jet and which extends around the central core 602, and an outer cowl which constitutes the outer wall of the secondary jet and which extends around the inner cowl 606.

To ensure the maintenance of the dual-flow jet engine 600, the inner cowl 606 and the outer cowl each comprise at least one cowl which is mounted to be rotationally mobile on a fixed structure of the jet engine via hinges 608.

The inner cowl 606 thus has a fixed part 606a secured to the fixed structure and a mobile cowl 606b. The fixed part 606a has a first edge 610 and the mobile cowl 606b has a second edge 612. When the mobile cowl 606b is in a closed position, the second edge 612 extends along the first edge 610 and the mobile cowl 606b extends the fixed part 606a in order to form a continuous surface in order to ensure a seal. When the mobile cowl 606b is in an open position, the second edge 612 is separated from the first edge 610 and the mobile cowl 606b is separated outward from the fixed part 606a.

Regarding the mobile cowl 606b, it is desirable for its hinges 608 not to influence the flow of air in the secondary jet. For that, they are concealed on the side of the central core 602. Furthermore, because of the presence of the first edge 610, each hinge 608 must assume a form which allows it to go around the first edge 610. Because of these various constraints, each hinge 608 takes the form of a swan neck.

While these hinges 608 with swan neck fitting make it possible to ensure a good flow of the air, they can rapidly become bulky and become intrusive with regard to the elements which are housed inside the inner cowl 606, such as, for example, pipelines and electrical conductors. The placement of such hinges then generates bulk problems.

SUMMARY OF THE INVENTION

One object of the present invention is to propose a dual-flow jet engine which has a cowl with a cowl mounted to be rotationally mobile via at least one hinge with swan neck fitting whose bulk is reduced.

To this end, a dual-flow jet engine for an aircraft is proposed, the dual-flow jet engine comprising:
 a fixed structure,
 a central core constituting the engine,
 a cowl which constitutes a wall of a secondary jet extending around the central core, the cowl comprising a fixed part secured to the fixed structure and a mobile cowl mounted to be rotationally mobile on the fixed structure via at least one hinge with swan neck fitting between an open position and a closed position, the fixed part having a first edge and the mobile cowl having a second edge, in which, when the mobile cowl is in closed position, the second edge extends against the first edge and in which, when the mobile cowl is in open position, the second edge is separated from the first edge,
the dual-flow jet engine being characterized in that, for each hinge with swan neck fitting, the fixed part is hollowed at the first edge, so as to delimit a recess which extends from the first edge and in that the recess is situated opposite the swan neck fitting and allows the passage of the swan neck fitting when the mobile cowl switches from the closed position to the open position.

The presence of a recess for the swan neck fitting allows for a reduction of the dimensions of the swan neck during the movement of the mobile cowl.

Advantageously, for each recess, the dual-flow jet engine comprises:
 a slide valve which is mounted to slide relative to the fixed part in the recess, between a blocking position in which it blocks the recess and a retracted position in which it is retracted to leave the recess free, and
 a movement transmission system which is provided to displace the slide valve from the blocking position to the retracted position at the same time as the mobile cowl switches from the closed position to the open position and vice versa.

According to a particular embodiment, the movement transmission system is a connecting rod of which one end is mounted articulated on the slide valve and of which the other end is mounted articulated on the swan neck fitting.

According to a particular embodiment, the movement transmission system comprises a return bellcrank mounted to be rotationally mobile on the fixed structure, a first connecting rod of which one end is mounted articulated on the slide valve and of which the other end is mounted articulated on one of the ends of the return bellcrank, and a second connecting rod of which one end is mounted articulated at the other end of the return bellcrank and of which the other end is mounted articulated on the swan neck fitting.

Advantageously, the dual-flow jet engine comprises:
 a main seal which runs along the first edge, and
 for each slide valve, a secondary seal which is fixed onto the slide valve and which, in blocking position, extends the main seal.

Advantageously, the slide link between the slide valve and the fixed part is produced by two grooves which are parallel and produced in the fixed part on either side of the slide valve, and by four blocks secured to the slide valve and distributed in pairs on either side of the slide valve in which each pair of blocks slides in one of the grooves.

Advantageously, the dual-flow jet engine comprises a peripheral seal fixed on either side of the slide valve and arranged between the slide valve and the fixed part.

According to a particular embodiment, the cowl is an inner cowl which constitutes an inner wall of the secondary jet.

According to another particular embodiment, the cowl is an outer cowl which constitutes an outer wall of the secondary jet.

The invention proposes an aircraft comprising at least one dual-flow jet engine according to one of the preceding variants.

BRIEF DESCRIPTION OF THE DRAWINGS

The features of the invention mentioned above, and others, will become more clearly apparent on reading the following description of an exemplary embodiment, the description being given in relation to the attached drawings, in which.

DETAILED DESCRIPTION OF THE PREFERRED EMBODIMENTS

Figure 1:
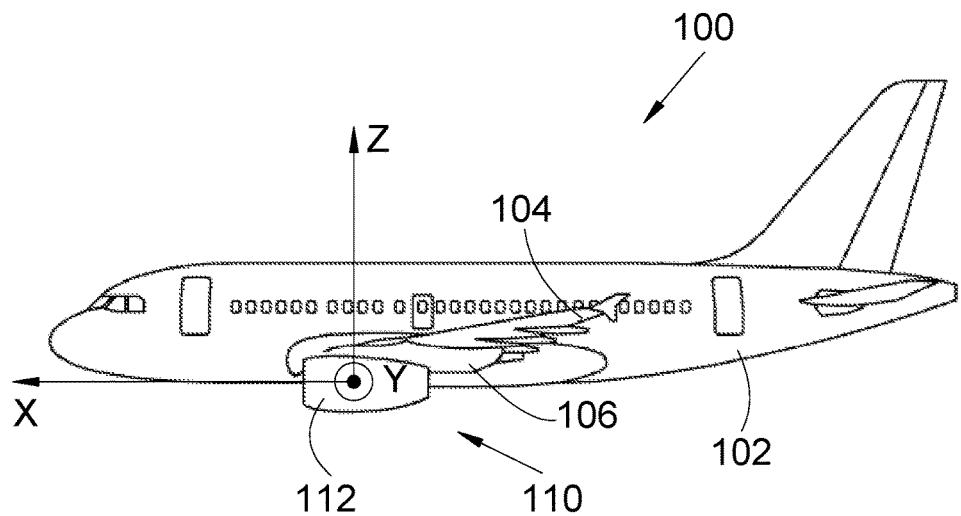
FIG. 1 is a side view of an aircraft having at least one dual-flow jet engine according to the invention.
Figure 7:
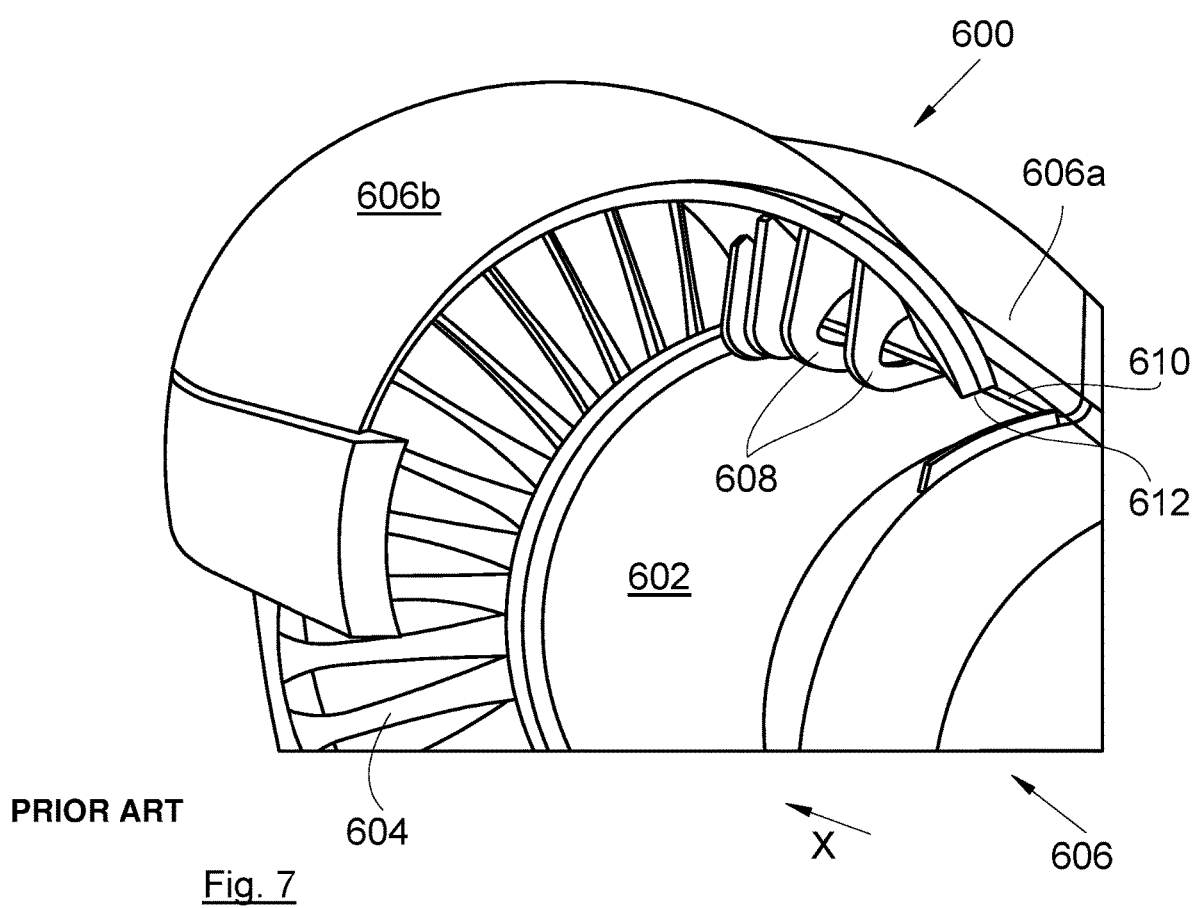
FIG. 7 is a perspective view of a dual-flow jet engine of the state of the art with a mobile cowl in open position.

In the following description, the terms relating to a position are taken with reference to an aircraft in position of normal advance, that is to say, as is represented in FIG. 1.

FIG. 1 shows an aircraft 100 which comprises a fuselage 102 having a wing 104 on each side. Under each wing 104, at least one dual-flow jet engine 110 is fixed via a pylon 106.

Throughout the following description, by convention, the direction X corresponds to the longitudinal direction of the dual-flow jet engine 110, this direction being parallel to the longitudinal axis of the dual-flow jet engine 110. Also, the direction Y corresponds to the direction oriented transversely relative to the dual-flow jet engine 110, and the direction Z corresponds to the vertical direction or to the height, these three directions X, Y, Z being mutually orthogonal.

Figure 2:
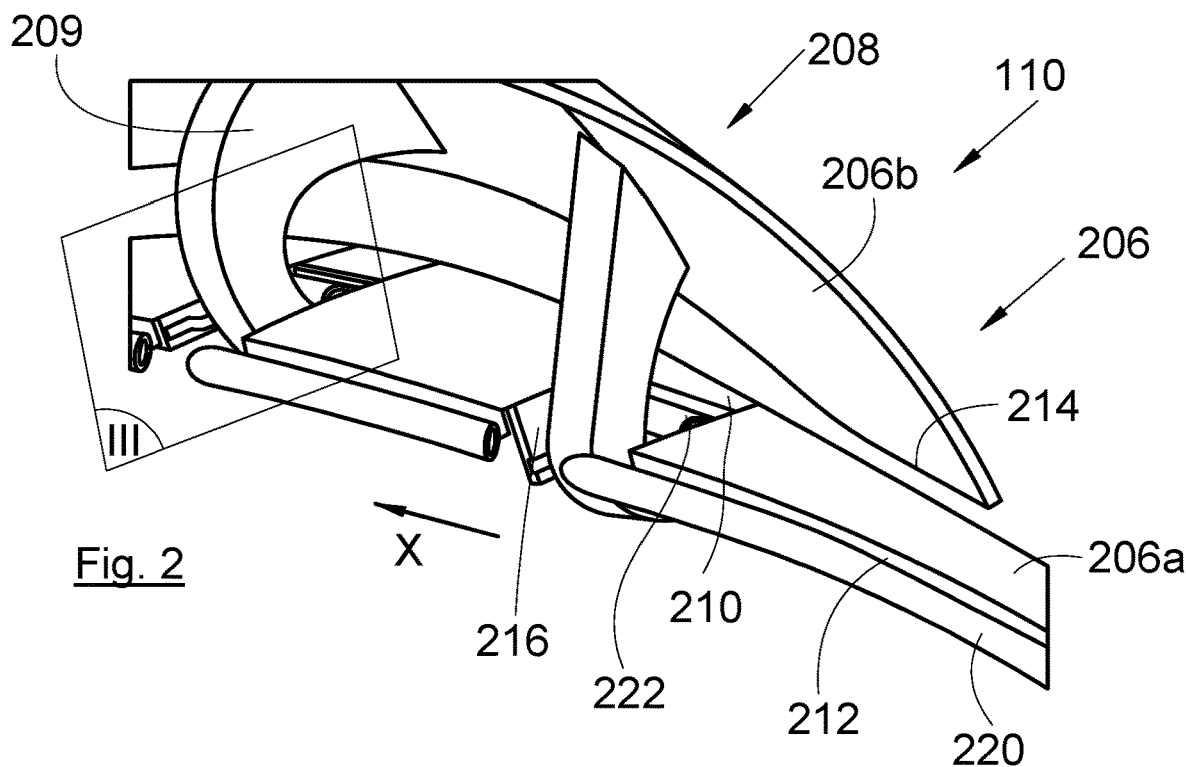
FIG. 2 is a perspective view of a mobile cowl in open position and mounted on hinges with swan neck fitting of a dual-flow jet engine according to the invention.

FIG. 2 shows the dual-flow jet engine 110 whose construction is similar to that of the dual-flow jet engine of the state of the art and it comprises a central core constituting the engine with a combustion chamber, a fan and an inner cowl 206 which constitutes the inner wall of a secondary jet extending around the central core.

The dual-flow jet engine 110 also comprises an outer cowl 112 that can be seen in FIG. 1, which constitutes the outer wall of the secondary jet and which extends around the inner cowl 206.

Conventionally, the outer cowl 112 is mounted to be rotationally mobile on the pylon 106 or on a fixed structure of the dual-flow jet engine 110 via hinges.

The inner cowl 206 comprises a fixed part 206a which is secured to a fixed structure of the dual-flow jet engine 110, and a mobile cowl 206b which is mounted to be rotationally mobile on the fixed structure of the dual-flow jet engine 110 via at least one hinge with swan neck fitting 208. The axis of rotation of the mobile cowl 206b and therefore of the hinges with swan neck fitting 208 is overall parallel to the longitudinal direction X. Each hinge with swan neck fitting 208 here comprises a swan neck fitting 209.

The fixed part 206a has a first edge 212 and the mobile cowl 206b has a second edge 214. When the mobile cowl 206b is in the closed position, the second edge 214 extends against the first edge 212 and the mobile cowl 206b extends the fixed part 206a in order to form a continuous surface. When the mobile cowl 206b is in the open position, the second edge 214 is separated from the first edge 212 and the mobile cowl 206b is separated outward from the fixed part 206a, that is to say, across the secondary jet and allows access to the interior of the central core.

Each swan neck fitting 209 overall takes the form of a C, of which one end is secured to the mobile cowl 206b and of which the other end is mounted articulated on the fixed structure and under the fixed part 206a, that is to say, on the side opposite the secondary jet.

Figure 3:
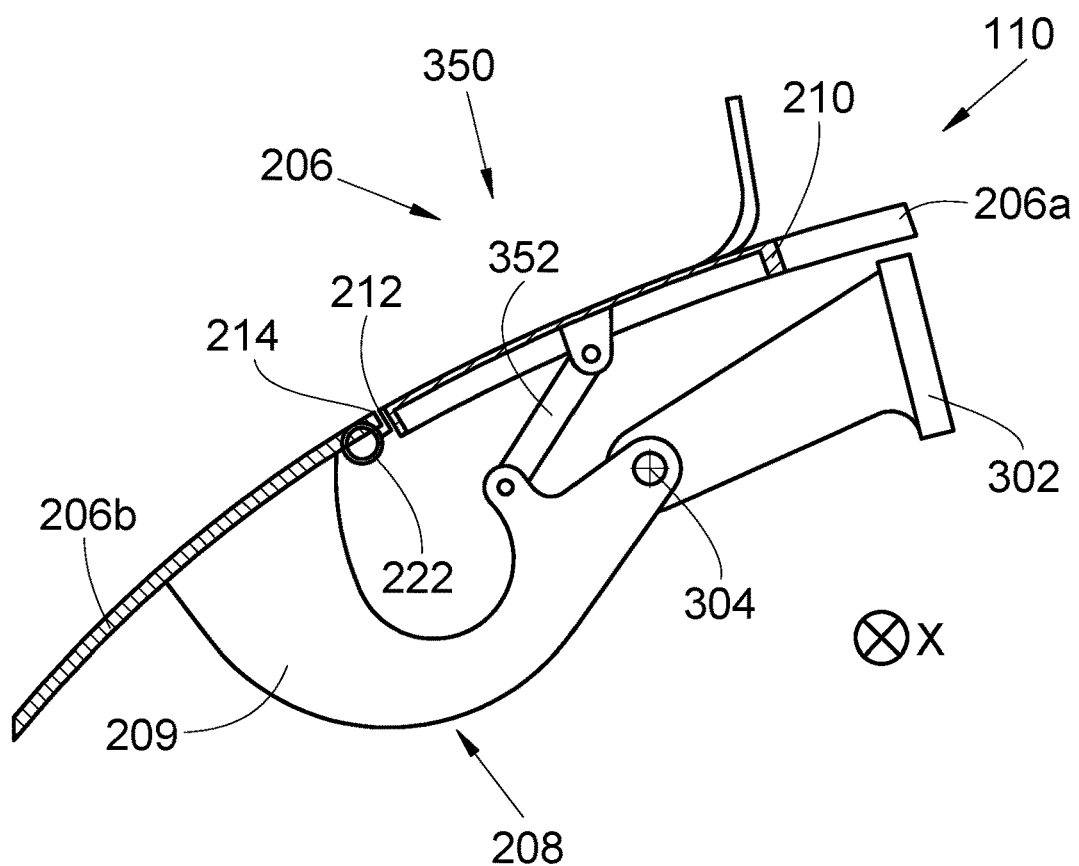
FIG. 3 is a cross-sectional view through the plane III of FIG. 2 in closed position of the mobile cowl for a first embodiment of the invention.
Figure 4:
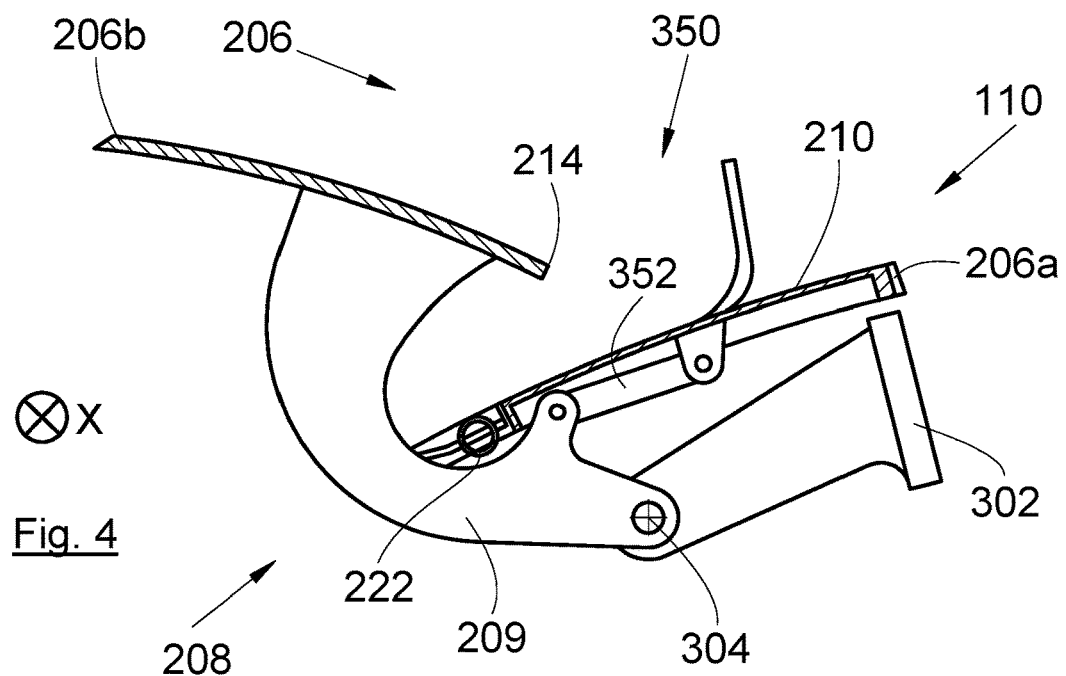
FIG. 4 is a view similar to that of FIG. 3, in open position of the mobile cowl.

FIG. 3 and FIG. 4 show a cross section of the dual-flow jet engine 110 at a hinge with swan neck fitting 208, respectively, when the mobile cowl 206b is in closed position and in open position for a first embodiment of the invention.

Figure 5:
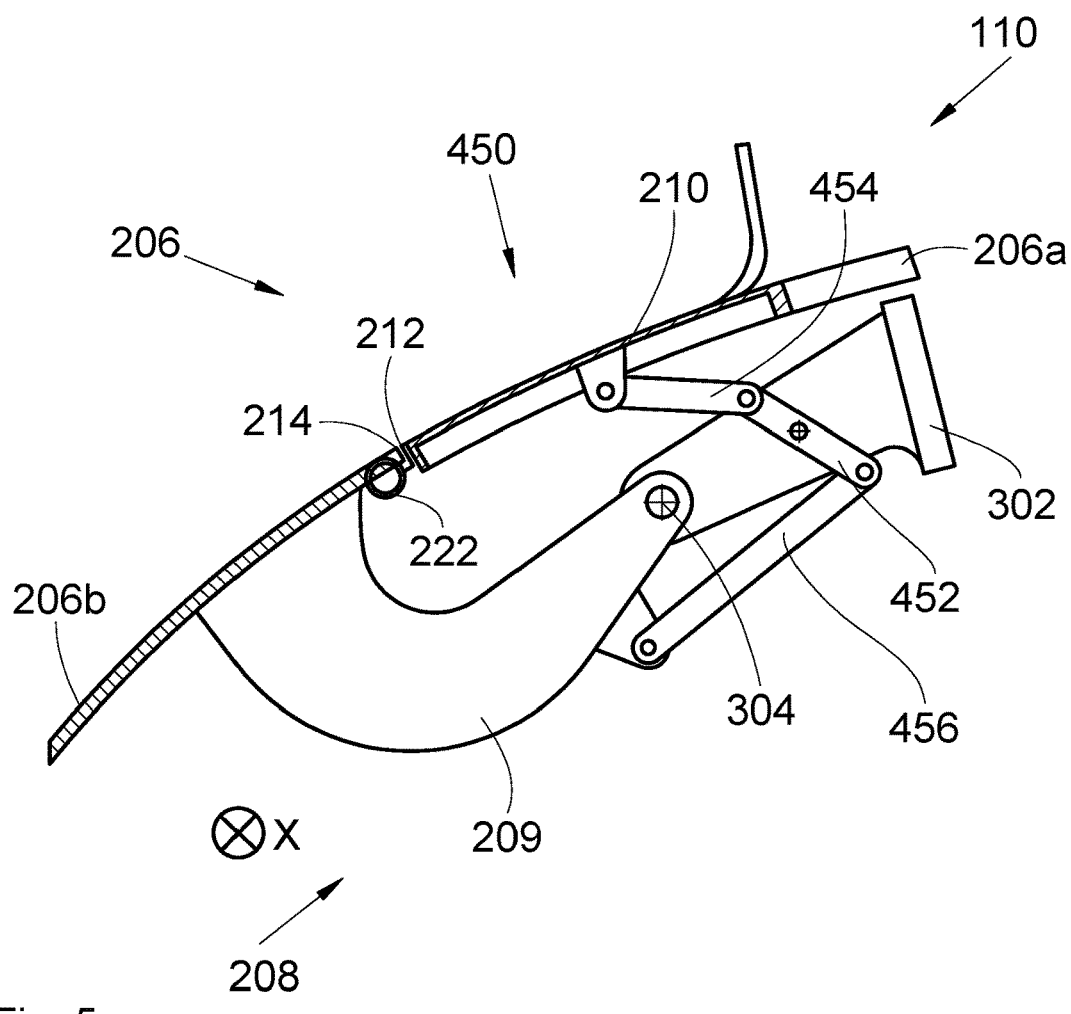
FIG. 5 is a cross-sectional view through the plane III of FIG. 2 in closed position of the mobile cowl for a second embodiment of the invention.

FIG. 5 shows a cross section of the dual-flow jet engine 110 at a hinge with swan neck fitting 208 in closed position for a second embodiment of the invention.

The swan neck fitting 209 is mounted articulated on the fixed structure 302 via a pivot link 304 produced, for example, in the form of a yoke joint.

For each hinge with swan neck fitting 208, the fixed part 206a is hollowed at the first edge 212, so as to delimit a recess 216 which extends from the first edge 212. The recess 216 is situated opposite the swan neck fitting 209 and allows the passage of the swan neck fitting 209 when the mobile cowl 206b switches from the closed position to the open position and vice versa. Thus, when the mobile cowl 206b switches from the closed position to the open position, the swan neck fitting 209 passes through the recess 216 without being hampered by the first edge 212 and the dimensions of the swan neck fitting 209 can be reduced compared to those of the fittings of the prior art because the swan neck fitting 209 no longer has to go around the first edge 212. Such an arrangement thus allows for a reduced bulk. The width of the recess 216 is greater than the thickness of the swan neck fitting 209 to avoid contact.

To ensure the seal at the recess 216 when the mobile cowl 206b is in closed position, the fixed part 206a is equipped, for each recess 216, with a slide valve 210 which is mounted to slide relative to the fixed part 206a in the recess 216.

The slide valve 210 is thus mobile between a blocking position in which it blocks the recess 216 and a retracted position in which it is retracted to leave the recess 216 free. The sliding of the slide valve 210 relative to the fixed part 206a is produced by a slide link between them.

The dual-flow jet engine 110 also comprises a movement transmission system 350, 450 which is provided to displace the slide valve 210 from the blocking position to the retracted position at the same time as the mobile cowl 206b switches from the closed position to the open position and vice versa. Thus, when the mobile cowl 206b is displaced from the closed position to the open position, the slide valve 210 is withdrawn from the recess 216 and frees it in order to allow the passage of the swan neck fitting 209.

In blocking position, an edge of the slide valve 210 extends the first edge 212 and comes against the second edge 214 and the slide valve 210 forms an aerodynamic continuity with the fixed part 206a and the mobile cowl 206b.

In the first embodiment of the invention represented in FIGS. 3 and 4, the movement transmission system 350 takes the form of a connecting rod 352 of which one end is mounted articulated on the slide valve 210 and of which the other end is mounted articulated on the swan neck fitting 209. The connecting rod 352 is, for example, a connecting rod with ball joints and, to effect an accurate setting, the connecting rod 352 is preferentially adjustable in length.

In the second embodiment of the invention represented in FIG. 5, the movement transmission system 450 comprises a return bellcrank 452 mounted to be rotationally mobile on the fixed structure 302, a first connecting rod 454 of which one end is mounted articulated on the slide valve 210 and of which the other end is mounted articulated on one of the ends of the return bellcrank 452, and a second connecting rod 456 of which one end is mounted articulated at the other end of the return bellcrank 452 and of which the other end is mounted articulated on the swan neck fitting 209. Each connecting rod 454, 456 is, for example, a connecting rod with ball joints and, to effect an accurate setting, each connecting rod 454, 456 is preferentially adjustable in length.

The arrangement of the second embodiment allows for an additional space saving and makes it possible to exploit the amplitude of the movement by acting on the lever arm function of the return bellcrank 452.

In the two embodiments presented here, the axes of rotation linked to the movement transmission system 350, 450 are parallel to the longitudinal direction X.

To ensure a better seal in closed position, the first edge 212 bears a main seal 220 which runs along the first edge 212 and, for each slide valve 210, the edge of the slide valve 210 which extends the first edge 212 in blocking position bears a secondary seal 222 which, in blocking position, extends the main seal 220.

Because of the presence of the recesses 216, the main seal 220 is discontinuous at each recess 216 and the presence of the secondary seal 222 on each slide valve 210 makes it possible to extend the main seal 220 and fill each discontinuity.

Figure 6:
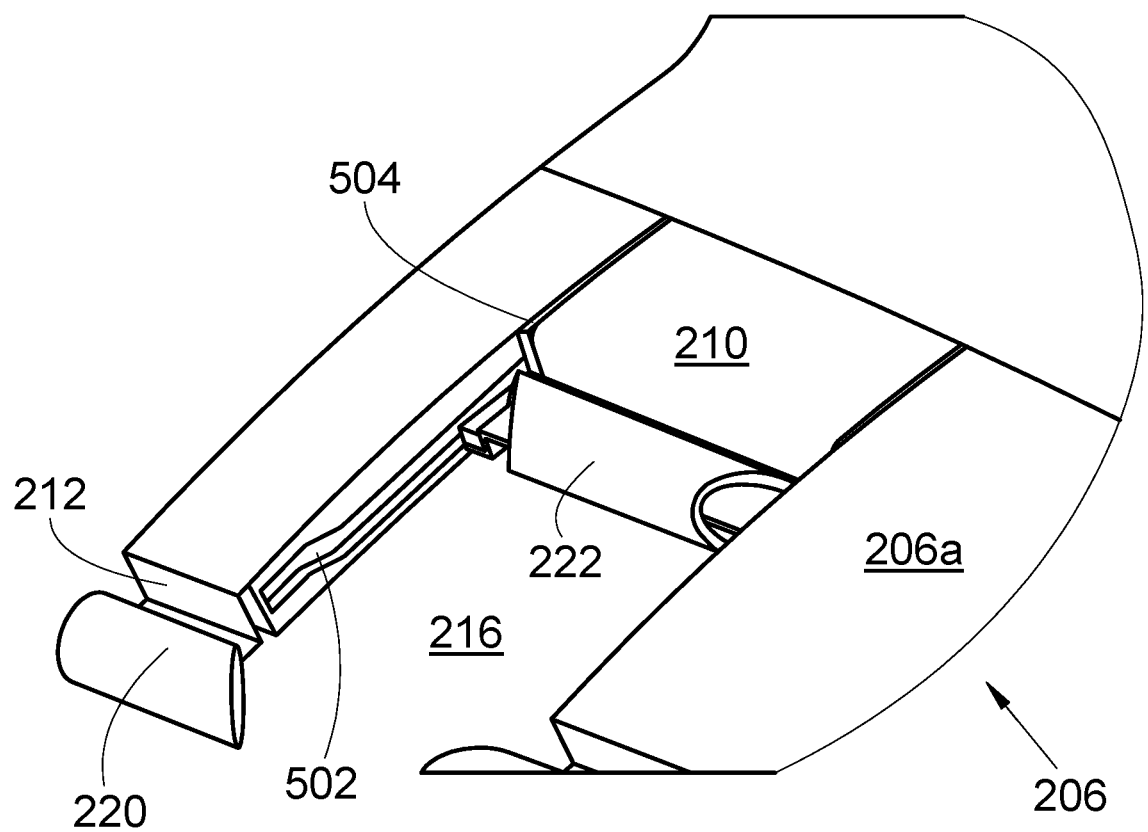
FIG. 6 shows an enlargement of FIG. 2.

FIG. 6 shows an enlargement of a slide valve 210 in retracted position in the fixed part 206a.

The slide link between the slide valve 210 and the fixed part 206a is produced here by two grooves 502 which are parallel and produced in the fixed part 206a on either side of the slide valve 210, and by four blocks secured to the slide valve 210 and distributed in pairs on either side of the slide valve 210 where each pair of blocks slides in one of the grooves 502.

To ensure the seal between the slide valve 210 and the fixed part 206a, a peripheral seal 504 is fixed on either side of the slide valve 210 and it is arranged between the slide valve 210 and the fixed part 206a.

The invention has been more particularly described in the case of an inner cowl, but it can be applied likewise to an outer cowl which constitutes an outer wall of the secondary jet.

While at least one exemplary embodiment of the present invention(s) is disclosed herein, it should be understood that modifications, substitutions and alternatives may be apparent to one of ordinary skill in the art and can be made without departing from the scope of this disclosure. This disclosure is intended to cover any adaptations or variations of the exemplary embodiment(s). In addition, in this disclosure, the terms "comprise" or "comprising" do not exclude other elements or steps, the terms "a" or "one" do not exclude a plural number, and the term "or" means either or both. Furthermore, characteristics or steps which have been described may also be used in combination with other characteristics or steps and in any order unless the disclosure or context suggests otherwise. This disclosure hereby incorporates by reference the complete disclosure of any patent or application from which it claims benefit or priority.

The invention claimed is:

1. A dual-flow jet engine for an aircraft, the dual-flow jet engine comprising:
   a fixed structure,
   a central core constituting the engine,
   a cowl which constitutes a wall of a secondary jet extending around the central core, the cowl comprising a fixed part secured to the fixed structure and a mobile cowl mounted to be rotationally mobile on the fixed structure via at least one hinge with swan neck fitting between an open position and a closed position, the fixed part having a first edge and the mobile cowl having a second edge, in which, when the mobile cowl is in closed position, the second edge extends against the first edge and in which, when the mobile cowl is in open position, the second edge is separated from the first edge,
   wherein, for each hinge with swan neck fitting, the fixed part is hollowed at the first edge, so as to delimit a recess which extends from the first edge and wherein the recess is situated opposite the swan neck fitting and allows passage of the swan neck fitting when the mobile cowl switches from the closed position to the open position.

2. The dual-flow jet engine according to claim 1, wherein the cowl is an inner cowl comprising an inner wall of the secondary jet.

3. The dual-flow jet engine according to claim 1, wherein the cowl is an outer cowl which comprises an outer wall of the secondary jet.

4. The dual-flow jet engine according to claim 1, wherein, for each recess, the dual-flow jet engine comprises:
   a slide valve which is mounted to slide relative to the fixed part in the recess, between a blocking position in which it blocks the recess and a retracted position in which it is retracted to leave the recess free, and
   a movement transmission system which is provided to displace the slide valve from the blocking position to the retracted position at the same time as the mobile cowl switches from the closed position to the open position and vice versa.

5. The dual-flow jet engine according to claim 4, wherein the movement transmission system comprises a connecting rod, of which one end is mounted articulated on the slide valve and of which an other end is mounted articulated on the swan neck fitting.

6. The dual-flow jet engine according to claim 4, wherein the movement transmission system comprises a return bellcrank mounted to be rotationally mobile on the fixed structure, a first connecting rod, of which one end is mounted articulated on the slide valve and of which an other end is mounted articulated on one of the ends of the return bellcrank, and a second connecting rod, of which one end is mounted articulated at the other end of the return bellcrank and an other end of the second connecting rod is mounted articulated on the swan neck fitting.

7. The dual-flow jet engine according to claim 4, further comprising:

a main seal which runs along the first edge, and
for each slide valve, a secondary seal which is fixed onto the slide valve and which, in blocking position, extends the main seal.

8. The dual-flow jet engine according to claim 4, wherein a slide link between the slide valve and the fixed part is produced by two grooves which are parallel and produced in the fixed part on either side of the slide valve, and by four blocks secured to the slide valve and distributed in pairs on either side of the slide valve in which each pair of blocks slides in one of the grooves.

9. The dual-flow jet engine according to claim 4, further comprising a peripheral seal fixed on either side of the slide valve and arranged between the slide valve and the fixed part.

10. An aircraft comprising at least one dual-flow jet engine according to claim 1.

* * * * *